(12) United States Patent
Yokoyama

(10) Patent No.: US 9,322,313 B2
(45) Date of Patent: Apr. 26, 2016

(54) DEPOSITION PREVENTION METHOD AND TURBOCHARGER

(75) Inventor: Fumihiko Yokoyama, Tokyo (JP)

(73) Assignee: IHI CORPORATION (JP)

(*) Notice: Subject to any disclaimer, the term of this patent is extended or adjusted under 35 U.S.C. 154(b) by 351 days.

(21) Appl. No.: 13/980,425

(22) PCT Filed: Dec. 26, 2011

(86) PCT No.: PCT/JP2011/080019
§ 371 (c)(1),
(2), (4) Date: Jul. 18, 2013

(87) PCT Pub. No.: WO2012/098807
PCT Pub. Date: Jul. 26, 2012

(65) Prior Publication Data
US 2013/0298531 A1    Nov. 14, 2013

(30) Foreign Application Priority Data

Jan. 20, 2011    (JP) .................. 2011-010266

(51) Int. Cl.
*F02D 23/00* (2006.01)
*F01D 5/14* (2006.01)
(Continued)

(52) U.S. Cl.
CPC *F01N 3/08* (2013.01); *F01N 13/16* (2013.01); *F02B 39/00* (2013.01); *F02C 6/12* (2013.01); *F01D 5/288* (2013.01); *F05D 2220/40* (2013.01); *F05D 2230/90* (2013.01)

(58) Field of Classification Search
CPC ......... F01D 5/286; F01D 5/288; F01N 13/16; F01N 3/08; F02B 39/00; F02C 6/12; F05D 2220/40; F05D 2230/90

USPC .......... 60/602; 407/417; 416/241 R; 427/226, 427/576; 428/34.1; 423/594.9; 508/108
IPC ......................................................... C23C 4/06
See application file for complete search history.

(56) References Cited

U.S. PATENT DOCUMENTS 3,787,223 A * 1/1974 Reedy, Jr. ................. 416/241 R
4,668,583 A * 5/1987 Olander ....................... 428/408
(Continued)

FOREIGN PATENT DOCUMENTS

CN    101298687 A    11/2008
JP    59-049314    12/1984
(Continued)

OTHER PUBLICATIONS

A Machine translation copy to Kamito Yoshimi (Pub. Number JP 2001-131727 A), published on May 15, 2001.*
(Continued)

*Primary Examiner* — Thai Ba Trieu
(74) *Attorney, Agent, or Firm* — Ostrolenk Faber LLP

(57) ABSTRACT

The present invention is a deposition prevention method of coking deposits using a turbocharger (120) including a turbine (122) including a flow path section having a vane section, a nozzle, and a housing, and a compressor (124) configured to introduce air into an engine (110) using rotation of the vane section of the turbine, and installed at an exhaust path (202) of the engine. The method includes a film coating process of forming a film including an element having a standard free energy change in a carbonization reaction of −50 kJ/mol or more on at least one surface of the vane section, the nozzle and the housing of the flow path section of the turbine.

2 Claims, 4 Drawing Sheets

(51) Int. Cl.
*C23C 16/00* (2006.01)
*F01N 3/08* (2006.01)
*F01N 13/16* (2010.01)
*F02B 39/00* (2006.01)
*F02C 6/12* (2006.01)
*F01D 5/28* (2006.01)

(56) References Cited

U.S. PATENT DOCUMENTS

| | | | | |
|---|---|---|---|---|
| 4,735,556 | A | * | 4/1988 | Fujikake et al. ............... 417/407 |
| 4,892,579 | A | * | 1/1990 | Hazelton .......................... 419/46 |
| 5,264,244 | A | * | 11/1993 | Edwards, III ................. 427/226 |
| 5,266,360 | A | * | 11/1993 | Edwards, III ................. 427/226 |
| 5,269,137 | A | * | 12/1993 | Edwards, III ................... 60/766 |
| 5,507,623 | A | * | 4/1996 | Kojima et al. ............. 416/241 R |
| 5,840,267 | A | * | 11/1998 | Saegusa ..................... 423/594.9 |
| 6,228,513 | B1 | * | 5/2001 | Jaslier et al. ............. 416/241 R |
| 6,874,998 | B2 | * | 4/2005 | Roby ............................ 417/407 |
| 8,703,661 | B2 | * | 4/2014 | Oboodi et al. ................ 508/108 |
| 2002/0011467 | A1 | * | 1/2002 | Takeuchi et al. .............. 427/576 |
| 2002/0041928 | A1 | * | 4/2002 | Budaragin .................... 427/226 |
| 2008/0010986 | A1 | | 1/2008 | Fuhrmann et al. ............... 60/598 |
| 2012/0258266 | A1 | * | 10/2012 | Koban et al. ................ 428/34.1 |

FOREIGN PATENT DOCUMENTS

| | | |
|---|---|---|
| JP | 06-146008 | 5/1994 |
| JP | 2001-131727 | 5/2001 |
| JP | 2003-001427 | 1/2003 |
| JP | 2003-277976 | 10/2003 |
| JP | 2006272889 A * | 10/2006 |
| JP | 2011-007550 | 1/2011 |

OTHER PUBLICATIONS

International Search Report and Written Opinion mailed Feb. 7, 2012 in corresponding PCT International Application No. PCT/JP2011/080019.

Chinese Office Action, dated May 6, 2015, issued in corresponding Chinese Patent Application No. 201180065333.7, including English Translation. Total 8 pages.

* cited by examiner

|         | C     | O     | Mg   | Al    | Si    | S    | Ca   | Fe    | Cu    |
|---------|-------|-------|------|-------|-------|------|------|-------|-------|
| PAINT 1 | 20.79 | 26.71 | 2.58 | 24.22 | 14.20 | 0.53 | 0.75 | 10.22 | 0.00  |
| PAINT 3 | 27.10 | 16.84 | 0.20 | 0.49  | 13.54 | 0.24 | 0.30 | 10.38 | 30.92 |

(%)

DEPOSITION PREVENTION METHOD AND TURBOCHARGER

CROSS-REFERENCE TO RELATED APPLICATIONS

The present application is a 35 U.S.C. §§371 national phase conversion of PCT/JP2011/080019, filed Dec. 26, 2011, which claims priority to Japanese Patent Application No. 2011-010266, filed Jan. 20, 2011, the contents of which are incorporated herein by reference. The PCT International Application was published in the Japanese language.

TECHNICAL FIELD

The present invention relates to a deposition prevention method and a turbocharger that are capable of preventing generation of carbonaceous deposits (coking deposits) in a turbine of a turbocharger installed at an exhaust path of an engine.

BACKGROUND

A material evaporated from a fuel, a lubricant (engine oil), or the like contained in an exhaust gas (a gas phase) discharged from an engine is stuck to a turbine (a vane section and a housing) of a turbocharger installed at an exhaust path of the engine. Then, in a surface (a metal) of the turbine, a carbonization reaction caused by a stuck organic compound (a fuel or a lubricant) progresses, and an inorganic compound (caused by an antioxidant or a detergent dispersant) contained in a fuel or a lubricant is deposited. When deposits (coking deposits) of a carbon material (a material composed of carbon or a carbonized inorganic substance) are generated at a vane section (an impeller) of the turbine, the impeller is unbalanced. As a result, since vibrations are generated from the impeller and a clearance quantity between the impeller and the housing is decreased, the turbine may be damaged or rotational efficiency may be decreased.

In order to remove the coking deposits generated as described above from the turbine, a method of performing a water jet is employed. However, since the coking deposits generated by the material contained in such a gas phase have high hardness, it is impossible for the water jet to obtain a high removal effect.

Here, it can be considered that a certain treatment is performed on the surface of the turbine (the vane section and the housing) to prevent generation of the deposits in advance. A technique for plating chrome (Cr) on a metal surface (for example, Patent Document 1) has been proposed as a technique for preventing eduction of carbon to a metal surface in contact with a liquid containing hydrocarbon when the liquid flows. Patent Document 1 discloses a technique for performing Cr plating to prevent exposure to a metal surface of nickel (Ni) or iron (Fe), which is a catalyst for promoting decomposition of hydrocarbon, in order to prevent eduction of carbon by suppressing decomposition of hydrocarbon in a liquid.

In addition, a technique of coating alumina ($Al_2O_3$) on a surface (for example, Patent Document 2) has also been proposed. Patent Document 2 discloses a technique for coating $Al_2O_3$, which does not promote an oxidation reaction, rather than manganese (Mn), copper (Cu), platinum (Pt), or palladium (Pd), which is a catalyst for promoting an oxidation reaction, in order to prevent hydrocarbon, fatty acid, or the like, from being stuck to an object surface by suppressing the oxidation reaction and promoting vaporization and evaporation from the surface.

RELATED ART DOCUMENTS

Patent Documents

[Patent Document 1] Japanese Unexamined Patent Application, First Publication No. H06-146008
[Patent Document 2] Japanese Examined Patent Application, Second Publication No. S59-49314

SUMMARY OF THE INVENTION

Problems to be Solved by the Invention

However, even when Cr plating or $Al_2O_3$ coating is performed on the metal surface using the techniques disclosed in Patent Documents 1 and 2, deposition of the coking deposits generated by the material contained in the above-mentioned gas phase could not be prevented, and on the contrary, generation of the coking deposits was promoted.

In consideration of the above-mentioned problem, it is an object of the present invention to provide a deposition prevention method and a turbocharger that are capable of suppressing a carbonization reaction and preventing generation of coking deposits generated in a turbine.

Means for Solving the Problems

In order solve the problems, the following configurations are employed. According to a first aspect of the present invention, there is provided a deposition prevention method of coking deposits using a turbocharger, which installed at an exhaust path of the engine, including a turbine including a flow path section having a vane section, a nozzle, and a housing, and a compressor configured to introduce air into an engine using rotation of the vane section of the turbine. The deposition prevention method of the coking deposits has a film coating process of forming a film including an element having a standard free energy change in a carbonization reaction of −50 kJ/mol or more on at least one surface of the vane section, the nozzle and the housing of the flow path section of the turbine.

According to a second aspect, in the deposition prevention method of the coking deposits, the element may be one or a plurality of elements selected from Ni, Si, Mg, Fe, Co, W, Pt, Au and Cu, or a compound thereof, preferably, Ni or Si, or a compound thereof, more preferably, Ni or a compound thereof According to a third aspect, there is provided a turbocharger installed at an exhaust path of an engine, the turbocharger including, a turbine including a vane section, a nozzle, and a housing, and a compressor configured to introduce air into the engine using rotation of the vane section of the turbine. A film including an element having a standard free energy change in a carbonization reaction of −50 kJ/mol or more is formed on at least a surface of the flow path section.

Effects of the Invention

According to the present invention, as the carbonization reaction is suppressed, generation of the coking deposit generated in the turbine can be prevented.

MODES FOR CARRYING OUT THE INVENTION

Figure 1:
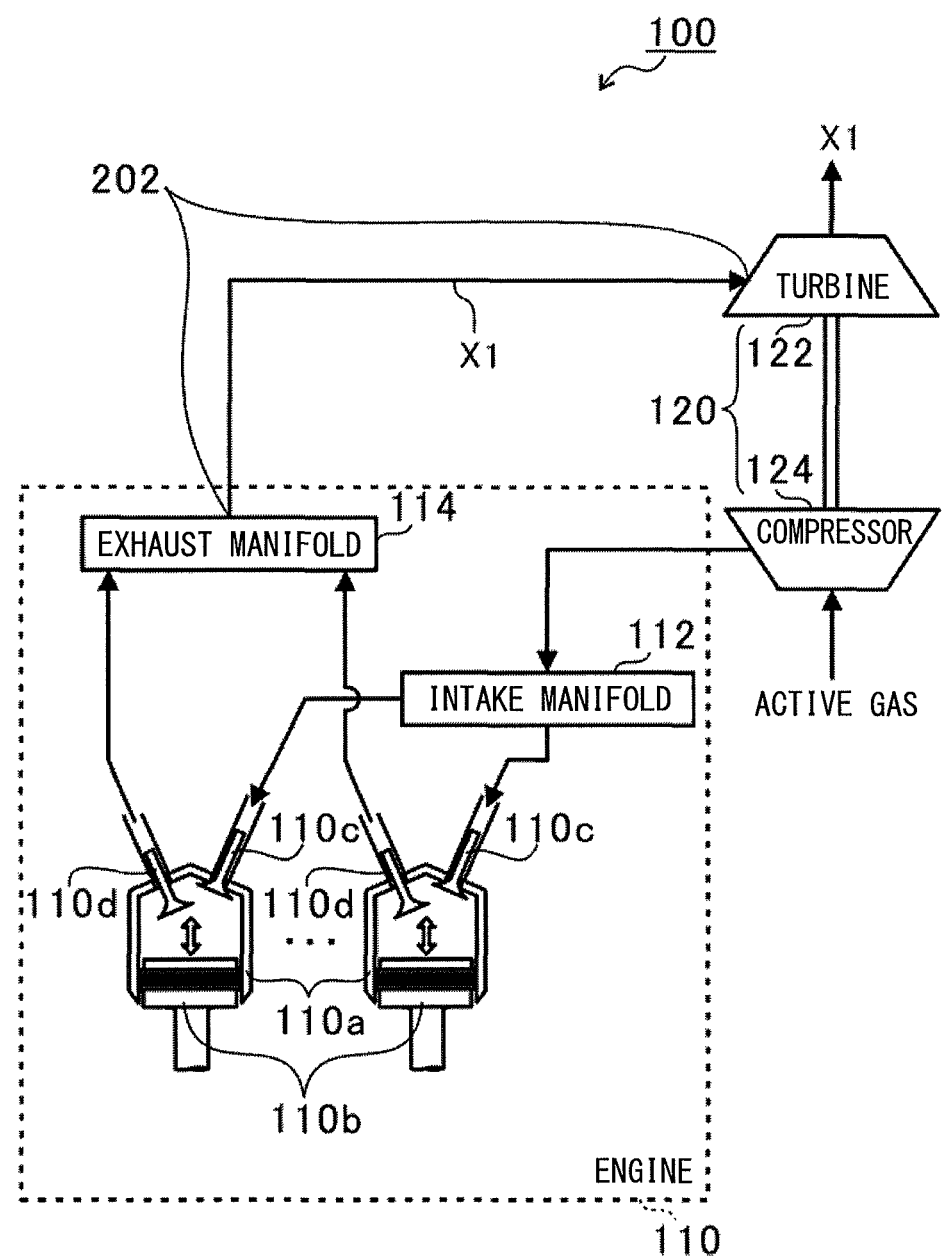
FIG. 1 is a view for describing a coking deposit generation prevention system.

An exemplary embodiment of the present invention will be described in detail with reference to the accompanying drawings. Dimensions, materials and specific numerical values provided in the embodiment are provided merely for the convenience of understanding of the present invention, but do not limit the present invention unless they are specifically excluded. In addition, in the description and the drawings, like elements having substantially the same functions and configurations are designated by like reference numerals, description thereof will be omitted, and illustration of elements, which are not directed related to the present invention, will be omitted.

Coking Deposit Generation Prevention System

FIG. 1 is a view for describing a coking deposit generation prevention system 100 according to the embodiment. As shown in FIG. 1, the coking deposit generation prevention system 100 includes an engine 110, and a turbocharger 120. For example, the coking deposit generation prevention system 100 is used in a small-sized and medium-sized ship such as a patrol boat, a fishing boat, or the like. While the engine 110 is exemplarily described with reference to a 4-cycle engine (a 4-stroke engine), the coking deposit generation prevention system 100 may be used in a large-sized ship such as a container ship, a tanker, or the like, and a 2-cycle engine (a 2-stroke engine) may be employed in the engine 110. In addition, the coking deposit generation prevention system 100 can be used in a vehicle in which a biodiesel is used as a fuel.

The engine 110 includes a cylinder 110a, a piston 110b, intake valves 110c, exhaust valves 110d, an intake manifold 112, and an exhaust manifold 114. In the engine 110, the piston 110b connected to a crosshead (not shown) slidably reciprocates in the cylinder 110a in a direction shown by a white arrow in FIG. 1 through 4 steps such as suction, compression, combustion, and exhaust. The intake manifold 112 collects a plurality of intake paths in communication with the cylinder 110a through the plurality of intake valves 110c installed at the engine 110. The exhaust manifold 114 collects a plurality of exhaust paths in communication with the cylinder 110a through the plurality of exhaust valves 110d installed at the engine 110.

For example, the turbocharger 120 is a turbocharger for a ship, is installed at an exhaust path 202 at a downstream side of the exhaust manifold 114 of the engine 110, and includes a turbine 122 and a compressor 124 concentric with the turbine 122. The turbine 122 includes a vane section (an impeller) and a housing. The vane section of the turbine 122 is rotated by an exhaust gas X1 discharged from the exhaust manifold 114. The compressor 124 compresses an active gas (an oxidant such as oxygen, ozone, or the like, or a gaseous mixture (for example, an air) thereof) introduced from the outside by using rotation of the vane section of the turbine 122 to be introduced into the intake manifold 112, ad an intake pressure to the engine 110 is increased. As a result, an output of the engine 110 can be improved.

In the turbine 122 of the turbocharger 120 of the embodiment, a film including an element in which a standard free energy change in a carbonization reaction becomes −50 kJ/mol or more is formed at a surface of a flow path section including the vane section, the nozzle and the housing, at an operating temperature of the turbine 122 (for example, about 650° C. in the case of a turbocharger for a ship, about 1050° C. in the case of a turbocharger for a gasoline vehicle, about 850° C. in the case a turbocharger for a diesel vehicle, about 500° C. in the case of a turbocharger for a truck). Here, for example, the element in which the standard free energy change in the carbonization reaction becomes −50 kJ/mol or more is one or a plurality of elements selected from Ni, silicon (Si), magnesium (Mg), Fe, cobalt (Co), tungsten (W), Pt, gold (Au), and Cu, or a compound thereof, preferably Ni or Si, or a compound thereof, more preferably, Ni or a compound thereof.

Figure 2:
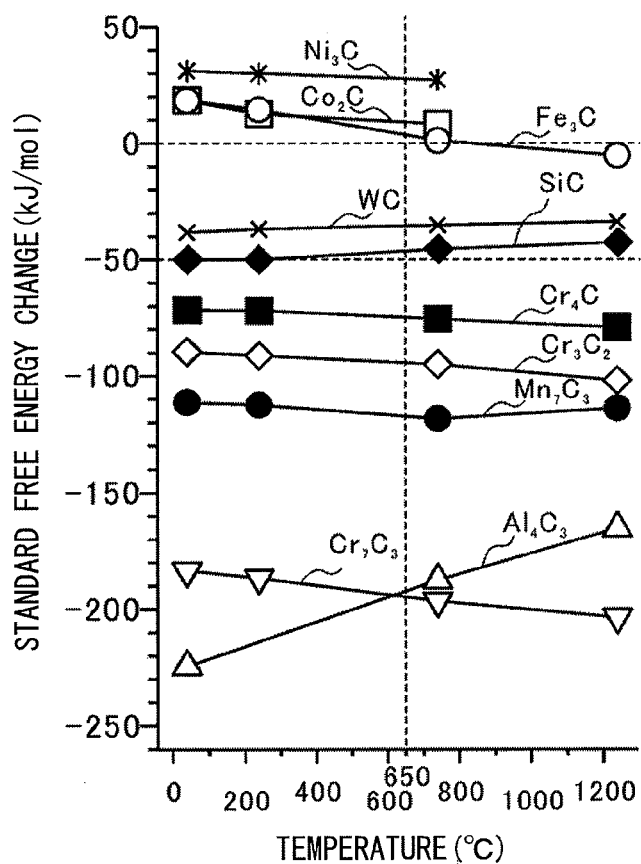
FIG. 2 is a view for describing standard free energy changes in carbonization reactions of various kinds of elements.

FIG. 2 is a view for describing standard free energy changes in carbonization reactions of various kinds of elements. When the standard free energy change is 0, the carbonization reaction is in an equilibrium state, when the standard free energy change shows a positive (more than 0) value, the carbonization reaction is suppressed (it is difficult to progress the carbonization reaction), and when the standard free energy change shows a negative (less than 0) value, it is easy to progress the carbonization reaction.

Referring to FIG. 2, for example, in the case of Ni, Fe, and Co, since the standard free energy change shows a positive value at 650° C., which is an operating temperature of the turbine 122, it is difficult to progress the carbonization reaction. Meanwhile, for example, in the case of W, Cr, Mn, and Al, since the standard free energy change shows a negative value at 650° C., which is an operating temperature of the turbine 122, it is easy to progress the carbonization reaction.

Accordingly, when a film of a material having a standard free energy change of a carbonization reaction of 0 or more is formed on the surface of the turbine 122, the carbonization reaction is suppressed, and generation of coking deposits (deposits of carbon or a carbonized metal) to the surface of the turbine 122 can be prevented.

In addition, referring to FIG. 2, in the case of W or Si, while the standard free energy change does not have a positive value, but it is more than −50 kJ/mol. Accordingly, a film of a material having a larger standard free energy change of a carbonization reaction (for example, a material having a standard free energy change of −50 kJ/mol or more) than that of a material of the turbine 122 such as W or Si is formed, the carbonization reaction is suppressed, and generation of coking deposits (eduction matters of carbon or a carbonized metal) to the surface of the turbine 122 can be prevented, in comparison with the case in which no treatment is performed on the surface of the turbine 122.

Deposition Prevention Method

In a deposition prevention method according to the embodiment, a film including an element having a standard free energy change in a carbonization reaction of −50 kJ/mol or more is formed in the turbine 122 of the turbocharger 120 formed at the exhaust path 202 of the engine 110 (a film coating process).

Here, the film coating process is a process of forming a film on the turbine 122 by applying a paint including an element having a standard free energy change in a carbonization reaction of −50 kJ/mol or more, or thermal-spraying or plating an element having a standard free energy change of −50 kJ/mol or more. In addition, in the film coating process, forming a film by applying paint or plating an element is more preferable than forming a film by thermal-spraying an element. For example, since a large number of vacancies are formed in the film when the film is formed by thermal-spraying the element, the oil may come in contact with a base material (iron) through the vacancies. That is, it is difficult to sufficiently block the oil and the base material. Meanwhile, since such vacancies are not generated when the film is formed by applying the paint or plating the element, it is possible to perfectly block the oil and the base material. Further, since a surface of the film becomes rough when the film is formed by thermal-spraying the element, after-treatment such as surface polishing or the like is needed to planarize the surface. Meanwhile, when the film is formed by applying the paint or plating the element, since the surface does not become rough, such after-treatment is not needed. In addition, when the paint is applied, the application may be performed using a spray, or may be manually performed. Preferably, the spray may be used to further suppress a roughness of the surface of the film.

In addition, in the film coating process, in the turbine including a flow path section having a vane section, a nozzle, and a housing, at least one of the vane section, the nozzle, and the housing is coated.

Further, in the case in which the film is formed by applying the paint including the element having the standard free energy change of −50 kJ/mol or more, when the turbine 122 is operated after applying the paint, a temperature of the turbine 122 is about 650° C. For this reason, the paint is sintered and the film including the element contained in the paint is formed.

Example 1

FCD (ductile cast irons), which is a material of the housing of the turbine 122, applied with paints 1, 2 and 3, an FCD plated with Ni, and a non-treated FCD were left under an atmosphere in which a mixed sample mixed at a ratio of a LO (lubricating oil: lubricant) and a FO (fuel oil) of 8:2 is evaporated, at 650° C. for 120 hours. Here, the paint 1 and 2 are silicon-based resins in which Al is dispersed, and the paint 3 is a silicon-based resin in which Cu is dispersed.

Figure 3:
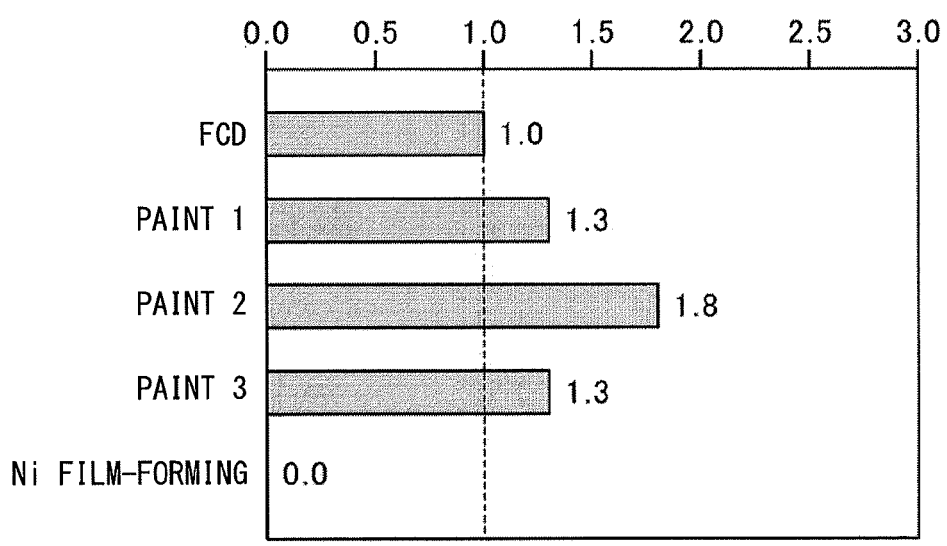
FIG. 3 is a view for describing a non-treated ductile cast iron (FCD) and a generation amount (a deposition amount) of the coking deposits when a surface treatment is performed on the FCD.
Figures 4A, 4B:
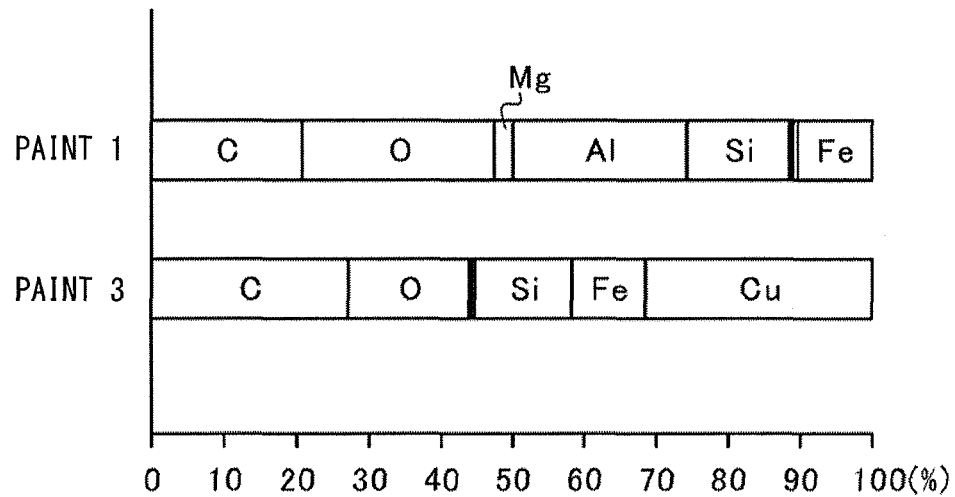
FIG. 4A is a view for describing a result when a paint is left under an Ar atmosphere at 650° C. for 120 hours as a simple substance.
FIG. 4B is a view for describing a result when a paint is left under an Ar atmosphere at 650° C. for 120 hours as a simple substance.

FIG. 3 is a view for describing a generation amount (a deposition amount) of coking deposits of the non-treated FCD and the FCD when surface treatment is performed on the FCD, and FIGS. 4A and 4B are views for describing results when the paint 1 and the paint 3 are left under an Ar atmosphere at 650° C. for 120 hours as simple substances. In addition, an evaluation of solid material generation disclosed in Japanese Unexamined Patent Application, First Publication No. 2011-7550 was used as an evaluation method of a generation amount of the coking deposits.

As shown in FIG. 3, when the generation amount of the coking deposits of the non-treated FCD was 1.0, the generation amount of the coking deposits was 1.3 times at the paint 1, 1.9 times at the paint 2, and 1.3 times at the paint 3, and the generation amount of the coking deposits was 0 at Ni.

Referring to FIGS. 4A and 4B, it will be appreciated that, when the paint 1 is left under an Ar (argon) atmosphere at 650° C. for 120 hours, an organic compound contained in the silicon resin is volatilized, and a compound including Al, Si, and Fe, which is an inorganic compound, is generated. That is, it may be considered that, when the paint 1 is applied, a film including Al, Si, and Fe is mainly present on the surface of the FCD. It is presumed that, while Al has a standard free energy change of less than −50 kJ/mol, the generation amount of the coking deposit is suppressed 1.3 times by Si and Fe.

Meanwhile, in the paint 2 in which Al is dispersed in a silicon-based resin, it can be considered that Si cannot suppress the progress of the carbonization reaction by Al, and a generation amount of the coking deposit is increased 1.8 times.

Referring to FIGS. 4A and 4B, it will be appreciated that, when the paint 3 is left under an Ar atmosphere at 650° C. for 120 hours, an organic compound contained in the silicon resin is volatilized, and a compound including Si, Fe, and Cu, which is an inorganic compound, is generated. That is, it can be considered that, when the paint 3 is applied, a film including Si, Fe, and Cu is mainly present on the surface of the FCD. It is presumed that, since these elements have the standard free energy change of −50 kJ/mol or more, the generation amount of the coking deposit is suppressed 1.3 times.

As shown in FIG. 3, when a Ni film is formed on the FCD, the generation amount of the coking deposit could be remarkably reduced to 0. Referring to FIG. 2, it is presumed that, since Ni has a high standard free energy change of 30 kJ/mol, almost no coking deposit was generated without promoting the carbonization reaction.

Example 2

A Ni-based alloy (for example, INCONEL (trademark) or the like), which is a material of the impeller of the turbine 122, to which paint 1, paint 2 or paint 3 is applied, and a non-treated Ni-based alloy are left under an atmosphere in which a mixed sample mixed at a ratio of LO and FO of 8:2 is evaporated, at 650° C. for 120 hours. Here, the paints 1 and 2 are silicon-based resin in which Al is dispersed, and the paint 3 is a silicon-based resin in which Cu is dispersed.

Figure 5:
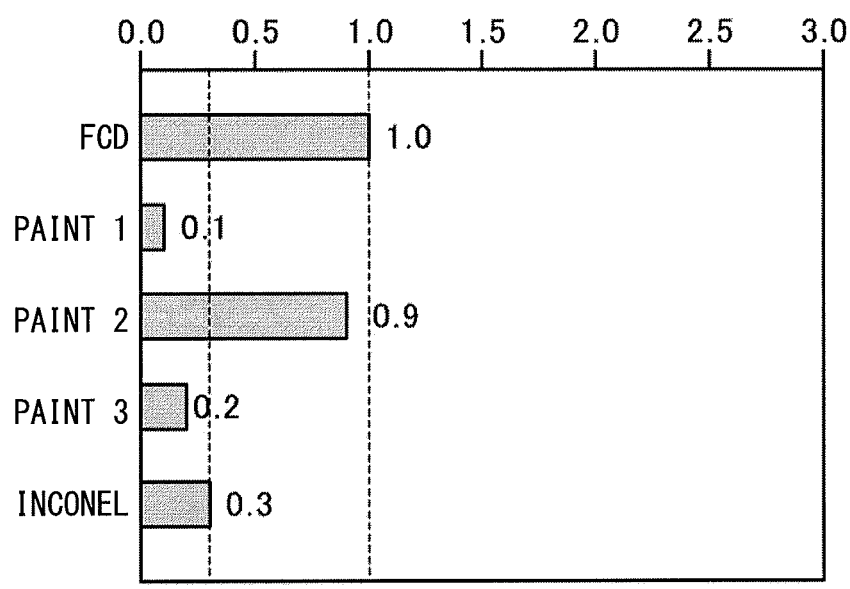
FIG. 5 is a view for describing a generation amount (a deposition amount) of coking deposits when a surface treatment is performed with respect to a non-treated FCD, a non-treated Ni-based alloy, and a Ni-based alloy.

FIG. 5 is a view for describing a generation amount (a deposition amount) of coking deposit of a non-treated FCD, a non-treated Ni-based alloy, and a Ni-based alloy when surface treatment is performed. In addition, like Example 1, an evaluation of solid material generation disclosed in Japanese Unexamined Patent Application, First Publication No. 2009-149668 was used as an evaluation method of a generation amount of the coking deposits.

As shown in FIG. 5, when the generation amount of the coking deposits of the non-treated FCD was 1.0, the coking deposits were generated (deposited) 0.1 times at the paint 1, 0.9 times at the paint 2, 0.2 times at the paint 3, and 0.3 times at the non-treated Ni-based alloy. In other words, in comparison with the generation amount of the coking deposits of the non-treated FCD, the generation amounts of the coking deposits of the non-treated Ni-based alloy and the Ni-based alloys on which the paints 1 to 3 are applied were reduced.

It is presumed that, since the Ni-based alloy is an alloy of Ni having a large standard free energy change, the generation amounts of the coking deposits of the non-treated Ni-based alloy and the Ni-based alloys to which the paints 1 to 3 are applied were reduced in comparison with the non-treated FCD due to influence of the Ni-based alloy.

As described in Examples 1 and 2, as the film including the element having the standard free energy change of −50 kJ/mol or more such as Si or Ni is formed at the surfaces of the vane section and the housing of the turbine 122, generation of the coking deposits in the surface of the turbine 122 can be reduced.

As described above, in the deposition prevention method according to the embodiment, as the film including the element having the standard free energy change in the carbonization reaction of −50 kJ/mol or more is formed on the surface of the turbine 122, the carbonization reaction in the surface of the turbine 122 can be suppressed, and generation of the coking deposits generated in the turbine 122 can be prevented.

Hereinabove, while an exemplary embodiment of the present invention has been described with reference to the accompanying drawings, the present invention is not limited to such an embodiment. It will be apparent to those skilled in the art that various modifications or variations may be made without departing from the scope of the present invention described in the description, and will also fall into the technical scope of the present invention.

INDUSTRIAL APPLICABILITY

According to the present invention, the deposition prevention method and the turbocharger that are capable of suppressing generation of the carbonaceous deposits (coking deposits) in the turbine of the turbocharger installed at the exhaust path of the engine can be used.

DESCRIPTION OF REFERENCE NUMERALS

110 . . . engine
120 . . . turbocharger
122 . . . turbine
124 . . . compressor
202 . . . exhaust path

The invention claimed is:

1. A method of preventing deposition of a carbide having been generated by an organic compound in a fuel or a lubricant, on a surface of a flow path section of a turbine of a turbocharger in an internal combustion engine, the flow path section of the turbine having a vane section, a nozzle, and a housing, and the turbocharger including a compressor configured to introduce air into the engine and to be driven by a rotation of the vane section of the turbine during an engine operation, the method comprising:
    forming at least one surface of the vane section, the nozzle and the housing of the flow path section of the turbine with a film of Nickel to prevent the deposition of the carbide having been generated by the organic compound in the fuel or the lubricant.

2. An internal combustion engine having a turbocharger installed at an exhaust path of the engine, the turbocharger comprising:
    a turbine including a flow path section having a vane section, a nozzle, and a housing; and
    a compressor configured to introduce air into the engine and to be driven by a rotation of the vane section of the turbine,
        wherein a film of Nickel is formed on at least a surface of the flow path section so as to prevent deposition of a carbide having been generated by an organic compound in a fuel or a lubricant, on the surface of the flow path section.

* * * * *